(12) United States Patent
Kim et al.

(10) Patent No.: US 12,709,694 B2
(45) Date of Patent: Aug. 18, 2026

(54) AUTOMOTIVE HYDRAULIC TRANSFER PAINT COMPOSITION AND COATED PRODUCTS AND PARTS FOR AUTOMOBILES INCLUDING SAME

(71) Applicants: HYUNDAI MOTOR COMPANY, Seoul (KR); KIA CORPORATION, Seoul (KR)

(72) Inventors: Hyun Jung Kim, Seoul (KR); Jae Sik Seo, Hwaseong-si (KR); Hyoung Il Kim, Gunpo-si (KR); Suk Hyung Seo, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 912 days.

(21) Appl. No.: 18/084,386

(22) Filed: Dec. 19, 2022

(65) Prior Publication Data

US 2023/0227686 A1 Jul. 20, 2023

(30) Foreign Application Priority Data

Jan. 18, 2022 (KR) ........................ 10-2022-0007081

(51) Int. Cl.
*C09D 133/08* (2006.01)
*C09D 7/20* (2018.01)
(Continued)

(52) U.S. Cl.
CPC ............. *C09D 133/08* (2013.01); *C09D 7/20* (2018.01); *C09D 7/48* (2018.01); *C09D 7/61* (2018.01);
(Continued)

(58) Field of Classification Search
CPC .. C09D 133/14; C09D 175/06; C09D 167/00; C09D 7/65; C09D 7/69; C09D 133/066
See application file for complete search history.

(56) References Cited

U.S. PATENT DOCUMENTS 5,910,369 A * 6/1999 Macris ................. C09D 175/04
523/415
7,351,476 B2 4/2008 Kawazu et al.
(Continued)

FOREIGN PATENT DOCUMENTS

CN 1626596 A 6/2005
CN 101610916 A 12/2009
(Continued)

OTHER PUBLICATIONS

Partial machine translation of JP 2015-105297 A (Year: 2015).*
(Continued)

*Primary Examiner* — Kregg T Brooks
(74) *Attorney, Agent, or Firm* — Lempia Summerfield Katz LLC

(57) ABSTRACT

A paint composition suitable for hydraulic transfer painting of automotive parts is provided. The painting composition includes urethane beads, thereby imparting a good touch sensation to a painted surface and improving the durability of the painted automotive part. The paining composition includes a resin mixture containing an acrylic polyol resin and a polyester polyol resin, a solvent, an anti-sedimentation agent, a curing accelerator, a UV stabilizer, a polysiloxane-based surface conditioning agent, a wax, and a urethane bead.

16 Claims, 3 Drawing Sheets

(51) Int. Cl.

| | |
|---|---|
| ***C09D 7/40*** | (2018.01) |
| ***C09D 7/48*** | (2018.01) |
| ***C09D 7/61*** | (2018.01) |
| ***C09D 7/65*** | (2018.01) |
| ***C09D 133/06*** | (2006.01) |
| ***C09D 133/14*** | (2006.01) |
| ***C09D 167/00*** | (2006.01) |
| ***C09D 167/08*** | (2006.01) |

(52) U.S. Cl.

CPC ................. *C09D 7/65* (2018.01); *C09D 7/69* (2018.01); *C09D 133/066* (2013.01); *C09D 133/14* (2013.01); *C09D 167/00* (2013.01); *C09D 167/08* (2013.01)

(56) References Cited

U.S. PATENT DOCUMENTS

| | | | | |
|---|---|---|---|---|
| 8,252,135 | B2 | 8/2012 | Takeuchi et al. | |
| 9,068,098 | B2 | 6/2015 | Ikeda et al. | |
| 12,252,625 | B2 | 3/2025 | Murata et al. | |
| 2005/0123770 | A1 | 6/2005 | Kawazu et al. | |
| 2005/0241531 | A1* | 11/2005 | Meyer | C09C 1/3081 106/490 |
| 2010/0062254 | A1* | 3/2010 | Park | C08G 18/791 528/367 |
| 2011/0189445 | A1 | 8/2011 | Takeuchi et al. | |
| 2014/0057085 | A1 | 2/2014 | Ikeda et al. | |
| 2016/0154436 | A1* | 6/2016 | Woo | B32B 27/283 522/170 |
| 2017/0306164 | A1 | 10/2017 | Jo et al. | |
| 2022/0033677 | A1 | 2/2022 | Murata et al. | |

FOREIGN PATENT DOCUMENTS

| | | | | | |
|---|---|---|---|---|---|
| CN | 104673073 | A | | 6/2015 | |
| CN | 107075276 | A | | 8/2017 | |
| CN | 113166578 | A | | 7/2021 | |
| JP | H08245913 | A | * | 9/1996 | |
| JP | 2001113543 | A | | 4/2001 | |
| JP | 4020113 | B2 | | 12/2007 | |
| JP | 5302483 | B2 | | 10/2013 | |
| JP | 2015105297 | A | * | 6/2015 | C09D 7/61 |
| KR | 20040047436 | A | | 6/2004 | |
| KR | 20080101187 | A | * | 11/2008 | C09D 7/48 |
| KR | 20090028198 | A | * | 3/2009 | C08L 75/04 |
| KR | 101394819 | B1 | | 5/2014 | |
| KR | 20180043004 | A | * | 4/2018 | C09D 133/066 |
| KR | 20180118970 | A | * | 11/2018 | C09D 175/06 |

OTHER PUBLICATIONS

Partial machine translation of JP H08-245913 A (Year: 1996).*
Partial machine translation of KR 20080101187 A (Year: 2008).*
Partial machine translation of KR 20180118970 A (Year: 2018).*
Partial machine translation of KR 20090028198 A (Year: 2009).*
Partial machine translation of KR 20180043004 A (Year: 2018).*

* cited by examiner $$R_z = \frac{|Y_{p1}+Y_{p2}+Y_{p3}+Y_{p4}+Y_{p5}| + |Y_{v1}+Y_{v2}+Y_{v3}+Y_{v4}+Y_{v5}|}{5}$$

AUTOMOTIVE HYDRAULIC TRANSFER PAINT COMPOSITION AND COATED PRODUCTS AND PARTS FOR AUTOMOBILES INCLUDING SAME

CROSS REFERENCE TO RELATED APPLICATION

The present application claims priority to Korean Patent Application No. 10-2022-0007081, filed Jan. 18, 2022, the entire contents of which are incorporated herein for all purposes by this reference.

BACKGROUND

1. Technical Field

The present disclosure relates to a paint composition. More particularly, the present disclosure relates to a paint composition containing urethane beads to improve durability and to give good touch or feel to a painted surface so that the paint composition is suitably used for automotive hydraulic pressure transfer printing and relates to a coating product including the same.

2. Description of the Related Art

Among decorative parts for automobiles, hydraulic pressure transfer printing has been widely applied for decoration of mid-to-low-priced automobiles or as a basic specification for luxury cars. The hydraulic pressure transfer printing method is implemented in the order of color painting, film transfer, and clear painting on injection molded materials such as ABS and PC/ABS. At this time, the hydraulic pressure transfer printing method has advantages such as diversifying patterns and simplifying processes by the degree of freedom of printing, as well as reducing costs and increasing the degree of freedom of implementation shapes because the molding is unnecessary.

In particular, the hydraulic pressure transfer printing method applies a printing film that mimics the unique patterns of real materials such as real wood or real fabric. The visual effect can be improved by improving the print quality and diversifying the gloss of the protective clear coating layer.

However, because the conventional hydraulic pressure transfer printing is coated at the final finish of the printing layer, it is very difficult to improve the tactile part. Thus, when a customer directly touches the material, there is a disadvantage in that it could be easily recognized as a simulation product because the texture unique to the real material was not implemented.

SUMMARY

Therefore, under the background as described above, it is necessary to develop a paint composition that is applied to the hydraulic pressure transfer printing method to realize not only the appearance level but also the texture of a real material such as real wood and real fabric according to design requirements.

The present disclosure is to solve the above problems. An objective of the present disclosure is to provide a paint composition suitable for hydraulic pressure transfer printing for automotive parts so that the printed parts provide a good feel or touch sensation (i.e., a real material-level texture). Another objective is to provide a coated product including the same.

The objectives of the present disclosure are not limited to the objectives mentioned above. The objectives of the present disclosure should become more apparent from the following description and are realized by means and combinations thereof described in the claims.

The coating composition, according to the present disclosure, includes a resin mixture including an acrylic polyol resin and a polyester polyol resin, a solvent, an anti-sedimentation agent, a curing accelerator, an ultraviolet (UV) stabilizer, a polysiloxane-based surface conditioning agent, a wax, and a urethane bead.

The coating composition further includes a matting agent including silica. The coating composition may include 45% to 60% by weight of the resin mixture, 30% to 40% by weight of the solvent, 3% to 5% by weight of the anti-sedimentation agent, 0.1% to 0.5% by weight of the curing accelerator, 0.2% to 1.5% by weight of the UV stabilizer, 0.3% to 1% by weight of the polysiloxane-based surface conditioning agent, 1% to 3% by weight of the wax, 1% to 6% by weight of the urethane bead, and 0.5% to 2% by weight of the matting agent, based on the total composition.

The acrylic polyol resin may include a first acrylic polyol resin and a second acrylic polyol resin.

The first acrylic polyol resin may have a weight-average molecular weight (Mw) in a range of 500 to 1500 g/mol, a glass transition temperature (Tg) in a range of 50° C. to 60° C., an acid value in a range of 3 to 5 mgKOH/g, and a hydroxyl value in a range of 58 to 60 mg KOH/g. The second acrylic polyol resin may have a weight-average molecular weight (Mw) in a range of 1800 to 3000 g/mol, a glass transition temperature (Tg) in a range of 40° C. to 50° C., an acid value in a range of 1 to 2 mg KOH/g, and a hydroxyl value in a range of 25 to 26 mgKOH/g.

The polyester polyol resin may have a weight-average molecular weight (Mw) in a range of 300 to 800 g/mol, an acid value in a range of 1 to 3 mgKOH/g, and a hydroxyl value in a range of 112 to 114 mgKOH/g.

The solvent includes an ester-based solvent, a ketone-based solvent, or a combination thereof. The ester-based solvent may include normal butyl acetate, isobutyl acetate, ethyl acetate, or combinations thereof. The ketone-based solvent may include methyl isobutyl ketone, methyl ethyl ketone, cyclohexanone, or combinations thereof.

The anti-sedimentation agent may include amide wax, polyethylene wax, or a combination thereof.

The curing accelerator may include a dibutyltin dilaurate.

The UV stabilizer may include a hydroxyphenyl-benzotriazole-based stabilizer and a decanedioic acid-based stabilizer.

The wax may include polytetrafluoroethylene (PTFE) wax, polyethylene wax, or a combination thereof.

The wax may have a particle size (D50) in a range of 6 to micrometers (μm).

The urethane bead may have a particle size (D50) in a range of 20 to 40 μm.

The urethane bead may be a non-crosslinked polymer.

The matting agent may be fumed silica.

The matting agent may have a particle size (D50) in a range of 8 to 12 μm.

The matting agent may have a pH value in a range of 6 to 7 and a specific surface area in a range of 200 to 300 $m^2$/g.

The coated product, according to the present disclosure, includes the paint composition.

The automotive part, according to the present disclosure, includes a base layer, a base color layer positioned on the base layer, a hydraulic transfer layer positioned on the base color layer, and a skin layer positioned on the hydraulic transfer layer. The skin layer includes the paint composition as disclosed herein.

The skin layer may further include a matting agent including silica.

The paint composition, according to the present disclosure, can realize the texture of real materials while enhancing the durability of the coated product.

In addition, the painted article, according to the present disclosure, may increase luxury by realizing a tactile effect at the level of real material.

The effects of the present disclosure are not limited to the effects mentioned above. The effects of the present disclosure include all effects that can be inferred from the following description.

DETAILED DESCRIPTION

Figure 1:
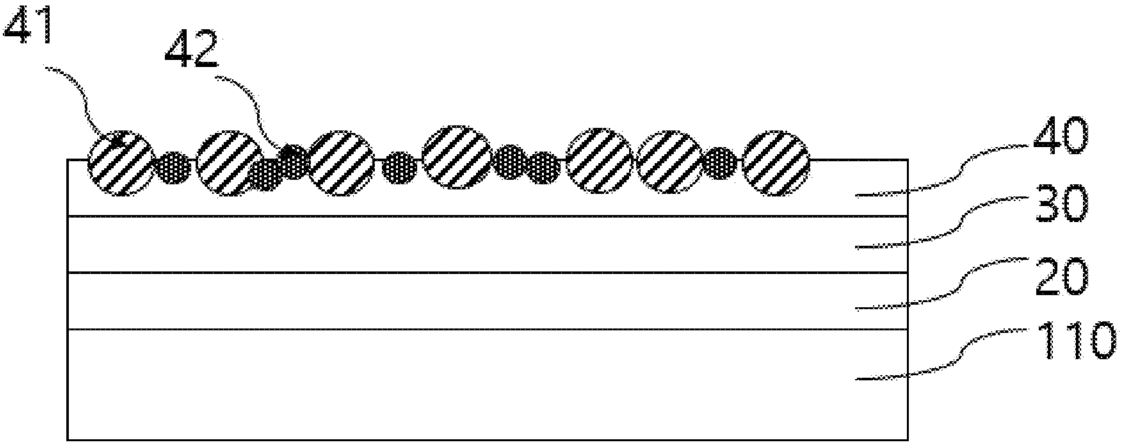
FIG. 1 is a diagram schematically showing an example of an automotive part according to the present disclosure.

The above objectives, other objectives, features, and advantages of the present disclosure should be understood through the following embodiments in conjunction with the accompanying drawings. However, the present disclosure is not limited to the embodiments described herein and may be embodied in other forms. Rather, the embodiments introduced herein are provided so that the disclosed content may be thorough and complete and so that the spirit of the present disclosure may be sufficiently conveyed to those skilled in the art.

In this specification, the terms "include" or "have" designate that one or more of the described features, numbers, steps, operations, components, or a combination thereof exist, and the possibility of addition of one or more other features or numbers, operations, components, or combinations thereof should not be excluded in advance.

Unless otherwise specified, all numbers, values, and/or expressions expressing quantities of ingredients, reaction conditions, polymer compositions, and formulations used herein contain all numbers, values and/or expressions in which such numbers occur in obtaining such values, among others. Because such expressions are approximations reflecting various uncertainties in the measurement, it should be understood as being modified by the term "about" in all cases. In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value containing the maximum value, are included unless otherwise indicated.

In this specification, when a range is described for a variable, the variable includes all values within the stated range including the stated endpoints of the range. For example, the range of "5 to 10" includes values of 5, 6, 7, 8, 9, and 10, as well as any sub-range of 6 to 10, 7 to 10, 6 to 9, 7 to 9, and also include any value between integers reasonable in the range described, such as 5.5, 6.5, 7.5, 5.5 to 8.5 and 6.5 to 9, and the like. For example, the range of "10% to 30%" includes values such as 10%, 11%, 12%, 13%, and all integers up to and including 30%, as well as any sub-range of 10% to 15%, 12% to 18%, 20% to 30%, etc., and also includes any value between reasonable % numbers within the scope of the stated range, such as 10.5%, 15.5%, 25.5%, and the like.

The present disclosure relates to an automotive hydraulic transfer paint composition with excellent touch and a coated product including the paint composition. As disclosed herein, the paint composition includes a resin mixture including an acrylic polyol resin and a polyester polyol resin, a solvent, an anti-sedimentation agent, a curing accelerator, a UV stabilizer, a polysiloxane surface conditioning agent, a wax, and a urethane bead.

The paint composition may further include a matting agent including silica. The paint composition may include 45% to 60% by weight of a resin mixture including acrylic polyol resin and polyester polyol resin, 30% to 40% by weight of a solvent, 3% to 5% by weight of an anti-sedimentation agent, 0.1% to 0.5% by weight of a curing accelerator, 0.2% to 1.5% by weight of a UV stabilizer, 0.3% to 1% by weight of a polysiloxane-based surface conditioning agent, 1% to 3% by weight of wax, 1% to 6% by weight of urethane beads, and 0.5% to 2% by weight of matting agent, based on the total composition.

According to the present disclosure, each component constituting the paint composition is described in more detail as follows.

(A) Resin Mixture

The resin mixture is included in an amount in a range of 45% to 60% by weight in the paint composition. The resin mixture may include an acrylic polyol resin and a polyester polyol resin.

The acrylic polyol resin may include a first acrylic polyol resin and a second acrylic polyol resin.

The first acrylic polyol resin is configured to provide the basic physical properties of the paint. Specifically, the first acrylic polyol resin may be an acrylic polyol based on methyl methacrylate (MMA) or 2-hydroxyethyl methacrylate (2-HEMA).

The first acrylic polyol resin may have a weight-average molecular weight (Mw) in a range of 500 to 1500 g/mol, a glass transition temperature (Tg) in a range of 50° C. to 60° C., an acid value in a range of 3 to 5 mgKOH/g, and a hydroxyl value in a range of 58 to 60 mgKOH/g.

The second acrylic polyol resin is configured to improve drying properties and coating workability of the coating film.

Specifically, the second acrylic polyol resin may be an acrylic polyol based on cellulose acetate butyrate (CAB), modified butyl methacrylate (BMA), or 2-hydroxyethyl methacrylate.

The second acrylic polyol resin may have a weight-average molecular weight (Mw) in a range of 1800 to 3000 g/mol, a glass transition temperature (Tg) in a range of 40° C. to 50° C., an acid value in a range of 1 to 2 mgKOH/g, and a hydroxyl value in a range of 25 to 26 mgKOH/g.

The polyester polyol resin is configured to restore the surface of a coating film damaged by external scratches and to impart elasticity of the coating film.

Specifically, the polyester polyol resin may be a hydroxyl polyester having a side branch.

The polyester polyol resin may have a weight-average molecular weight (Mw) in a range of 300 to 800 g/mol, an acid value in a range of 1 to 3 mgKOH/g, and a hydroxyl value in a range of 112 to 114 mgKOH/g.

(B) Solvent

The solvent is included in an amount in a range of 30% to 40% by weight in the paint composition. The solvent may include an ester-based solvent, a ketone-based solvent, or a combination thereof.

The ester-based solvent may include normal butyl acetate, isobutyl acetate, ethyl acetate, or a combination thereof.

The ketone-based solvent may include methyl isobutyl ketone, methyl ethyl ketone, cyclohexanone, or a combination thereof.

(C) Anti-Sedimentation Agent

The anti-sedimentation agent is included in an amount in a range of 3% to 5% by weight in the paint composition. The anti-sedimentation agent is configured to suppress sedimentation of beads and matting agents having relatively high specific gravity, thereby securing storage stability.

The anti-sedimentation agent may include amide wax, polyethylene wax, or a combination thereof.

(D) Curing Accelerator

The curing accelerator is included in an amount in a range of 0.1% to 0.5% by weight in the paint composition. The curing accelerator may improve the reaction rate between the main agent (hydroxyl group) and the curing agent (isocyanate). When the content of the curing accelerator exceeds 1% by weight, the pot life is shortened, and workability has deteriorated.

Specifically, the curing accelerator may be a dibutyltin dilaurate.

(E) UV Stabilizer

The UV stabilizer may be included in an amount in a range of 0.2% to 1.5% by weight in the paint composition.

The UV stabilizer may include a hydroxyphenyl-benzotriazole-based stabilizer and a decanedioic acid-based stabilizer.

The hydroxyphenyl-benzotriazole-based stabilizer has a strong IV absorbing ability to suppress the generation of radicals in the acrylic resin and has an effect of preventing discoloration, swelling, peeling, and loss of gloss, and the like of the acrylic resin.

Decanedioic acid-based stabilizers have the effect of removing the generated radicals. In addition, the decanedioic acid-based stabilizer may be mixed with the hydroxyphenyl-benzotriazole-based stabilizer to improve its role as a UV stabilizer. Specifically, the decanedioic acid-based stabilizer may use an amine-based light stabilizer (HALS).

(F) Polysiloxane-Based Surface Conditioning Agent

The polysiloxane-based surface conditioning agent may be included in an amount in a range of 0.2% to 1.5% by weight in the paint composition.

The polysiloxane-based surface conditioning agent may improve abrasion resistance by smoothing the surface to secure slip properties.

When the content of the surface conditioning agent is less than 0.5% by weight, physical properties of abrasion resistance and scratch resistance are deteriorated, and when the content exceeds 2% by weight, there is a limit in resistance in adhesion during repainting.

(G) Wax

Wax is for securing slip properties and abrasion resistance and may be included in an amount in a range of 1% to 3% by weight in the paint composition.

The wax may include polytetrafluoroethylene (PTFE) wax, polyethylene wax, or a combination thereof.

The wax may have a particle size (D50) in a range of 6 to 10 μm.

(H) Urethane Bead

The urethane bead is intended to implement the texture and provide the wear resistance of the beads.

The urethane bead may be included in an amount in a range of 1% to 6% by weight in the paint composition. When the content of the urethane beads is less than 1% by weight, the tactile effect is reduced, and when the content is more than 6% by weight, the urethane beads may cause problems in productivity by causing the nozzle bead jamming in the process.

The urethane beads may have a particle size (D50) in a range of 20 to 40 μm.

When the particle size is 20 μm or less, the urethane bead degrades the texture effect, and when the particle size is 40 μm or more, there is a problem that the coating workability and coating appearance are not excellent.

The urethane bead may be a non-crosslinked polymer.

(I) Matting Agent

The matting agent can secure scratch resistance by simultaneously implementing gloss reduction and print visibility.

The matting agent may be included in an amount in a range of 0.5% to 2% by weight in the paint composition. If the content of the matting agent is less than or exceeding the above range, there is a problem in that it is difficult to secure gloss for realizing a sense of reality.

The matting agent may include silica, (e.g., fumed silica).

The matting agent may have a particle size (D50) in a range of 8 to 12 μm, a pH value in a range of 6 to 7, and a specific surface area in a range of 200 to 300 $m^2/g$.

Here, the pH value may be a value measured by dropping a certain number of droplets on a solid surface and measuring a contact angle between the solid and the liquid in a generally used method.

The matting agent lowers the gloss to visually secure the luxury.

In addition, the matting agent may be transparent to remove factors that reduce visibility in a printing pattern due to gloss reduction due to surface scratches and blurry marks.

In addition, the matting agent can be designed in various ways because the gloss can be adjusted according to the content control.

In another aspect, the present disclosure relates to a coated product, including the paint composition.

In another aspect, the present disclosure relates to an automotive part. Referring to FIG. 1, the automotive part 100 includes a base layer 10, a base color layer 20 positioned on the base layer 10, and hydraulic transfer layer 30 positioned on the base color layer 20, and a skin layer 40 positioned on the hydraulic transfer layer 30. The skin layer 40 includes the paint composition as disclosed herein. The skin layer may further include a matting agent 42 including silica. FIG. 1 is a diagram schematically showing an automotive part according to the present disclosure.

Hereinafter, the present disclosure will be described in more detail with reference to a specific example. The following examples are merely illustrative to help the understanding of the present disclosure, and the scope of the present disclosure is not limited thereto.

EXAMPLES AND COMPARATIVE EXAMPLES

First, as shown in Tables 1 and 2 below, a paint composition was prepared with the composition and content described above.

TABLE 1

| Composition (wt. %) | <Example 1> | <Comparative Example 1> | <Comparative Example 2> | <Comparative Example 3> |
|---|---|---|---|---|
| Resin mixture | 54. | 54. | 54. | 54. |
| Mixed solvent | 35.5. | 35.5. | 35.5. | 35.5. |
| Anti-sedimentation agent | 5. | 5. | 5. | 5. |
| Curing accelerator | 0.3. | 0.3. | 0.3. | 0.3. |
| UV stabilizer | 0.7. | 0.7. | 0.7. | 0.7. |
| Surface conditioning agent | 0.5. | 0.5. | 0.5. | 0.5. |
| Wax | 1. | 1. | 1. | 1. |
| Urethane bead | 3. | — | — | — |
| Urea bead | — | 3. | — | — |
| Acrylic bead 1 | — | — | 3. | — |
| Acrylic bead 2 | — | — | — | 3. |
| Total | 100. | 100. | 100. | 100. |

1. Resin mixture:
   First acrylic polyol: MMA, 2-HEMA-based acrylic polyol, Mw=950, Tg=52° C., acid value=3 to 5, hydroxyl value=58 to 60
   Second acrylic polyol: CAB-modified BMA, 2-HEMA-based acrylic polyol, Mw=2100, Tg=45° C., acid value=1 to 2, hydroxyl value=25 to 26
   Polyester polyol: hydroxyl polyester, Mw=500, acid value=1 to 3, hydroxyl value=112 to 114
2. Mixed solvent: Mix ester-based solvent and ketone-based solvent in a 3:1 ratio
3. Anti-sedimentation agent: amide/polyethylene wax
4. Curing accelerator: dibutyltin dilaurate
5. UV stabilizer: hydroxyphenyl-pbenzotriazole-based stabilizer, decanedioic acid-based stabilizer (HALS)
6. Surface conditioning agent: polysiloxane-based
7. Wax: PTFE/Polyethylene wax, particle size (D50) 6 to 10 μm
8. Bead
   Urethane bead: polyurethane.
   Urea bead: cross-linked methyl urea resin,
   Acrylic bead 1: cross-linked PMMA type
   Acrylic bead 2: polystyrene type

TABLE 2

| Composition (wt. %) | <Example 2> | <Example 3> | <Comp. Example 4> | <Comp. Example 5> | <Comp. Example 6> | <Comp. Example 7> |
|---|---|---|---|---|---|---|
| Resin mixture | 54. | 54. | 54. | 54. | 54. | 54. |
| Mixed solvent | 34.5. | 35. | 34.5. | 35. | 34.5. | 35. |
| Anti-sedimentation agent | 5. | 5. | 5. | 5. | 5. | 5. |
| Curing accelerator | 0.3. | 0.3. | 0.3. | 0.3. | 0.3. | 0.3. |
| UV stabilizer | 0.7. | 0.7. | 0.7. | 0.7. | 0.7. | 0.7. |
| Surface conditioning agent | 0.5. | 0.5. | 0.5. | 0.5. | 0.5. | 0.5. |
| Wax | 1. | 1. | 1. | 1. | 1. | 1. |
| Urethane bead | 3. | 3. | 3. | 3. | 3. | 3. |
| Matting agent 1 | 1. | 0.5. | — | — | — | — |
| Matting agent 2 | — | — | 1. | 0.5. | — | — |
| Matting agent 3 | — | — | — | — | 1. | 0.5. |
| Total | 100. | 100. | 100. | 100. | 100. | 100. |

1. Resin mixture
   First acrylic polyol: MMA, 2-HEMA-based acrylic polyol, Mw=950, Tg=52° C., acid value=3 to 5, hydroxyl value=58 to 60
   Second acrylic polyol: CAB-modified BMA, 2-HEMA-based acrylic polyol, Mw=2100, Tg=45° C., acid value=1 to 2, hydroxyl value=25 to 26
   Polyester polyol: hydroxyl polyester, Mw=500, acid value=1 to 3, hydroxyl value=112 to 114
2. Mixed solvent: Mix ester-based solvent and ketone-based solvent in a 3:1 ratio
3. Anti-sedimentation agent: amide/polyethylene wax
4. Curing accelerator: dibutyltin dilaurate
5. UV stabilizer: hydroxyphenyl-benzotriazole-based stabilizer, decanedioic acid-based stabilizer (HALS)
6. Surface conditioning agent: polysiloxane-based
7. Wax: PTFE/polyethylene wax, particle size (D50) 6 to 10 μm
8. Bead: polyurethane.
9. Matting agent
   Matting agent 1: silicon dioxide. Fumed Silica, Particle size (d50) 9.5 μm. pH value 6.5, surface area (m2/g) 250
   Matting agent 2: silicon dioxide. wax-treated silica, particle size (d50) 6.3 μm. pH value 6.3, surface area (m2/g) 130, absorption rate (ml/g) 240
   Matting agent 3: silicon dioxide. fumed Silica, particle size (d50) 2 μm. pH value 6 to 7, surface area (m2/g) 130 to 130, absorption rate (ml/g) 240 to 240

Experimental Example

First, a curing agent composition was prepared by mixing polyisocyanate (HDI trimer), an ester-based solvent, and a ketone-based solvent in a ratio of 5:5, and the paint composition was prepared in Examples and Comparative Examples and the curing agent composition were mixed in a weight ratio of 10:2. After curing, the properties of the paint composition were evaluated by the following performance evaluation method, and the results are shown in Tables 3 and 4.

[Performance Evaluation Method]

(1) Appearance: after coating a plastic material with paint, it was dried at 70° C. for 30 minutes, and then cracks, pinholes, air bubbles, foreign matter, orange peel, cratering, and smoothness of the coated surface were visually evaluated. Evaluation: ◎=excellent, ○=good, Δ=normal, X=poor)

(2) Texture: three evaluators were evaluated emotionally by hand and averaged. Evaluation: ◎=excellent, ○=good, Δ=normal, X=poor)

(3) Adhesion: a tape peel test was performed according to ISO 2409 or JIS K 5600-5-6. Draw a perforation line on the surface of the coating film with a cutter to reach the base material, make 100 squares of size 2 mm×2 mm, attach them firmly to the surface with the specified adhesive cellophane tape (JIS Z1522), pull them off strongly at a 90° angle, and then remove the squares. The number of remaining coated squares and peeling forms were evaluated.

(4) Sunscreen resistance: after stacking 2 sheets of white cotton cloth on an acrylic plate (50×50 mm), Nivea SPF47 sunscreen was applied 0.25 g of on the entire surface, and it was placed on the test article, and the acrylic plate was pressed to adhere. After leaving the specimen in a thermostat at 80±2° C. for 1 hour, it was left at room temperature for about 10 minutes, washed with a neutral detergent, and dried The tape peel test and scratch test were performed according to ISO 2409 or JIS 5600-5-6.

(5) Abrasion resistance: after wrapping a friction element with a load of 4.9 (N) with double-sided canvas #10 (JIS L 3102) 20 mm×20 mm width, the test was performed 10,000 times under the conditions of stroke 100 (nm) and speed 60 (reciprocation/min).

(6) Scratch resistance: according to JIS K 6718, the surface of the test article or the test article prepared under the same conditions was scratched 100 mm at a load of 4.9 N and a speed of 100 mm/s, and then the surface condition was evaluated.

(7) Nail scratch property: after applying a scratch to the test article prepared in Examples and Comparative Examples with a nail, the gloss change and haze phenomenon were relatively compared. Evaluation: ◎=excellent, ○=good, Δ=normal, X=poor)

(8) Gloss and transparency: the realization and transparency of wood-like gloss were evaluated with the naked eye. Evaluation: ◎=excellent, ○=good, Δ=normal, X=poor)

TABLE 3

| Item | <Example 1> | <Comp. Example 1> | <Comp. Example 2> | <Comp. Example 3> |
|---|---|---|---|---|
| (1) Appearance | ◎ | ◎ | ◎ | ◎ |
| (2) Texture | ◎ | ◎ | ○ | X |
| (3) Adhesiveness | OK | OK | OK | OK |
| (4) Sunscreen resistance | OK | OK | OK | OK |
| (5) Abrasion resistance | OK | NG | OK | OK |
| (6) Scratch resistance | OK | NG | OK | OK |
| (7) Nail scratch resistance | ◎ | ○ | X | Δ |

Referring to Table 3, it may be seen that Example 1 using urethane beads in an amount of 1% to 6% by weight shows that a paint composition has excellent performance in both appearance, texture, adhesion, sunscreen resistance, abrasion resistance, scratch resistance, and nail scratch resistance. Therefore, it may be seen that the paint composition according to the present disclosure is included in an appropriate amount of each component so that all properties are balanced, and the quality is excellent.

On the other hand, Comparative Example 1 using 1% to 6% by weight of urea beads showed excellent performance in nail scratches, but the chemical bonding with acrylic urethane was weak so the beads fell out in the evaluation of abrasion resistance or scratch resistance.

In addition, in Comparative Examples 2 and 3, using 1% to 6% by weight of acrylic beads, the hardness was higher than that of nails, and thus the part to which the scratch was applied was whitened due to the powder that came out when nail scratches were applied.

Therefore, according to the present disclosure, by applying urethane beads in an appropriate amount, it is possible to prepare a paint composition having excellent surface texture while enhancing scratch resistance and abrasion resistance.

Accordingly, the present disclosure can reduce the type and content of additives to compensate for the vulnerability to external impact and distortion of the printed appearance and can secure a cost equivalent to that of conventional hydraulic transfer by using a small number of urethane beads.

TABLE 4

| Item | <Example 2> | <Example 3> | <Comp. Example 4> | <Comp. Example 5> | <Comp. Example 6> | <Comp. Example 7> |
|---|---|---|---|---|---|---|
| (1) Appearance | ◎ | ◎ | ◎ | ◎ | ◎ | ◎ |
| (2) Texture | ◎ | ◎ | ◎ | ○ | ○ | ○ |
| (3) Adhesiveness | OK | OK | OK | OK | OK | OK |
| (4) Sunscreen resistance | OK | OK | OK | OK | OK | OK |
| (5) Abrasion resistance | OK | OK | OK | OK | OK | OK |
| (6) Scratch resistance | OK | OK | OK | OK | OK | OK |
| (7) Nail scratch resistance | ◎ | ◎ | ○ | Δ | X | Δ |
| (8) Gloss and transparency | ◎ | ◎ | Δ | Δ | X | X |

Referring to Table 4, Examples 2 and 3, using a matting agent having a particle size (D50) of 8 to 12 μm, a pH value of 6 to 7, and a specific surface area value of 200 to 300 m2/g in an amount of 0.5% to 2% by weight, showed excellent performance in appearance, texture, adhesion, sunscreen resistance, wear resistance, scratch resistance, and nail scratch, and it was found that gloss and transparency were also excellently implemented.

Therefore, the matting agent may be transparent to remove factors that reduce visibility in a printing pattern due to gloss reduction due to surface scratches and blurry marks.

On the other hand, Comparative Examples 4 to 7 using a matting agent having a particle size, a pH value, and a specific surface area value out of the above range had poor gloss and transparency compared to Examples 2 to 3.

Therefore, the present disclosure may provide visual luxury by lowering the gloss by appropriately using a specific extinction agent, and there is an effect that the gloss can be adjusted according to the content of the extinction agent.

Thereafter, in order to evaluate the performance according to the particle size and content of the urethane beads, the internal durability performance evaluation was performed by changing the particle size and content of the urethane beads in the coating composition of Example 1, and the results are shown in Table 5. Here, "OK" means the result of passing the internal durability performance evaluation standard.

TABLE 5

| | 1 wt. % | 3 wt. % | 6 wt. % |
|---|---|---|---|
| Urethane beads (20 μm) | OK | OK | OK |
| Urethane beads (30 μm) | OK | OK | OK |
| Urethane beads (40 μm) | OK | OK | OK |

Referring to Table 5, it was found that when 1% to 10% by weight of urethane beads having a particle size in a range of 20 to 40 μm were used in the paint composition, all durability was excellent.

On the other hand, when the amount of urethane bead having a particle size of 20 μm was added less than 1% by weight in the paint composition, the physical properties were satisfactory, but the tactile effect was reduced, and when the number of urethane beads having a particle size of 20 μm was added more than 6% by weight, the productivity deteriorated in the process, and there were problems in that beads were caught in the nozzle and the beads were sunk during storage of the paint.

Next, the surface roughness of the composition in which the amount of urethane bead having a particle size of 20 μm was added 1% to 6% by weight in the paint composition was measured, respectively.

Figure 2:
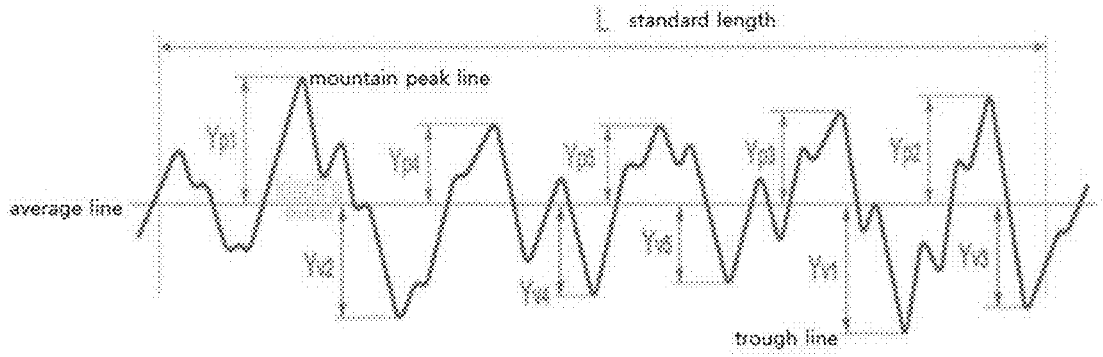
FIG. 2 is a diagram showing an example of a method of measuring an Rz value in surface roughness evaluation.

As shown in FIG. 2, the Rz value was defined, and FIG. 2 is a diagram showing a method of measuring the Rz value in surface roughness evaluation. In this case, the larger the Rz value, the rougher the surface.

Figure 3:
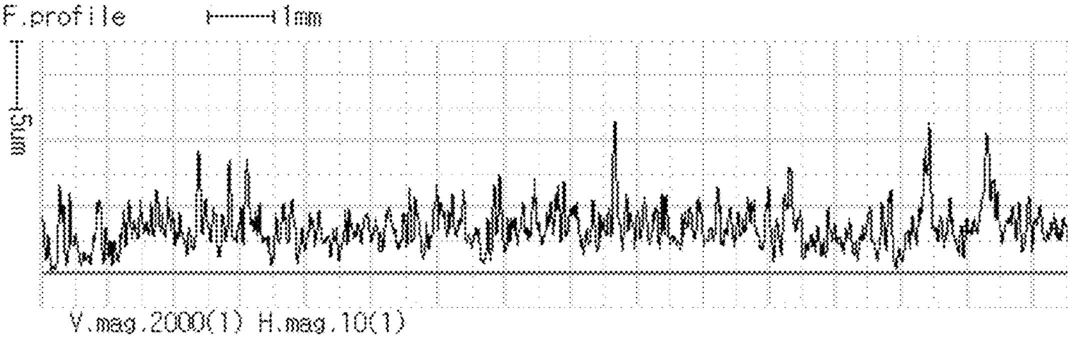
FIG. 3 is a graph showing a surface roughness evaluation resulting value according to a comparative example.
Figure 4:
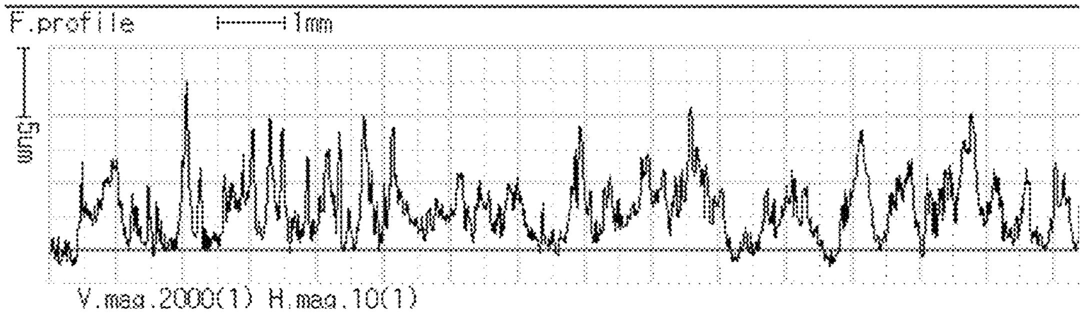
FIG. 4 is a graph showing a surface roughness evaluation resulting value according to an example.

FIG. 3 is a graph showing a surface roughness evaluation result value according to a Comparative Example. FIG. 4 is a graph showing a surface roughness evaluation result value according to an Example.

Referring to FIG. 3, the paint composition in which the amount of urethane bead having a particle size of 20 μm was added 1% by weight had an Rz value of 5.5 μm.

On the other hand, referring to FIG. 4, the coating composition in which the amount of urethane bead having a particle size of 20 μm was added 6% by weight had an Rz value of about 60% increased to 8.9 μm.

Therefore, according to the present disclosure, it is possible to manufacture a coated product having excellent texture by adjusting the urethane bead to appropriate content and thickness.

Although the embodiment of the present disclosure has been described above, the present disclosure may be implemented in other specific forms without changing the technical spirit or essential features thereof. Therefore, the embodiments described above are illustrative in all respects and not restrictive.

What is claimed is:

1. A paint composition, based on a total composition, comprising:

45% to 60% by weight of a resin mixture including an acrylic polyol resin and a polyester polyol resin;

30% to 40% by weight of a solvent;

3% to 5% by weight of an anti-sedimentation agent;

0.1% to 0.5% by weight of a curing accelerator;

0.2% to 1.5% by weight of a UV stabilizer;

0.3% to 1% by weight of a polysiloxane-based surface conditioning agent;

1% to 3% by weight of a wax; 1% to 6% by weight of a urethane bead; and 0.5% to 2% by weight of a matting agent comprising silica.

2. The paint composition of claim 1, wherein the matting agent has a D50 particle size in a range of 8 to 12 μm.

3. The paint composition of claim 1, wherein the matting agent has a pH value in a range of 6 to 7 and a specific surface area in a range of 200 to 300 $m^2/g$.

4. The paint composition of claim 1, wherein the matting agent is fumed silica.

5. The paint composition of claim 1, wherein the acrylic polyol resin comprises a first acrylic polyol resin and a second acrylic polyol resin, the first acrylic polyol resin has a weight-average molecular weight (Mw) in a range of 500 to 1500 g/mol, a glass transition temperature (Tg) in a range of 50° C. to 60° C., an acid value in a range of 3 to 5 mgKOH/g, and a hydroxyl value in a range of 58 to 60 mgKOH/g, and the second acrylic polyol resin has a weight-average molecular weight (Mw) in a range of 1800 to 3000 g/mol, a glass transition temperature (Tg) in a range of 40° C. to 50° C., an acid value in a range of 1 to 2 mgKOH/g, and a hydroxyl value in a range of 25 to 26 mgKOH/g.

6. The paint composition of claim 1, wherein the polyester polyol resin has a weight-average molecular weight (Mw) in a range of 300 to 800 g/mol, an acid value in a range of 1 to 3 mgKOH/g, and a hydroxyl value in a range of 112 to 114 mgKOH/g.

7. The paint composition of claim 1, wherein the solvent comprises an ester-based solvent and a ketone-based solvent, wherein the ester-based solvent comprises normal butyl acetate, isobutyl acetate, ethyl acetate, or a combination thereof, and wherein the ketone-based solvent comprises methyl isobutyl ketone, methyl ethyl ketone, cyclohexanone, or a combination thereof.

8. The paint composition of claim 1, wherein the anti-sedimentation agent comprises amide wax, polyethylene wax, or a combination thereof.

9. The paint composition of claim 1, wherein the curing accelerator comprises a dibutyltin dilaurate.

10. The paint composition of claim 1, wherein the UV stabilizer comprises a hydroxyphenyl-benzotriazole-based stabilizer and a decanedioic acid-based stabilizer.

11. The paint composition of claim 1, wherein the wax comprises polytetrafluoroethylene (PTFE) wax, polyethylene wax, or a combination thereof.

12. The paint composition of claim 1, wherein the wax has a D50 particle size in a range of 6 to 10 μm.

13. The paint composition of claim 1, wherein the urethane bead has a particle size in a range of 20 to 40 μm.

14. The paint composition of claim 1, wherein the urethane bead is a non-crosslinked polymer.

15. A coated product including a paint composition, the paint composition, based on a total composition, comprising:

45% to 60% by weight of a resin mixture including an acrylic polyol resin and a polyester polyol resin;

30% to 40% by weight of a solvent;

3% to 5% by weight of an anti-sedimentation agent;

0.1% to 0.5% by weight of a curing accelerator;

0.2% to 1.5% by weight of a UV stabilizer;

0.3% to 1% by weight of a polysiloxane-based surface conditioning agent;

1% to 3% by weight of a wax;

1% to 6% by weight of a urethane bead; and 0.5% to 2% by weight of a matting agent comprising silica.

16. An automotive part comprising:

a base layer;

a base color layer positioned on the base layer;

a hydraulic transfer layer positioned on the base color layer; and a skin layer positioned on the hydraulic transfer layer, wherein the skin layer comprises a paint composition, based on a total composition, having 45% to 60% by weight of a resin mixture including an acrylic polyol resin and a polyester polyol resin, 30% to 40% by weight of a solvent, 3% to 5% by weight of an anti-sedimentation agent, 0.1% to 0.5% by weight of a curing accelerator, 0.2% to 1.5% by weight of a UV stabilizer, 0.3% to 1% by weight of a polysiloxane-based surface conditioning agent, 1% to 3% by weight of a wax, 1% to 6% by weight of a urethane bead, and 0.5% to 2% by weight of a matting agent comprising silica.

* * * * *